Aug. 18, 1953   G. A. TINNERMAN   2,649,126
CAGED NUT AND RETAINING BRACKET THEREFOR
Filed Oct. 14, 1949   2 Sheets-Sheet 1
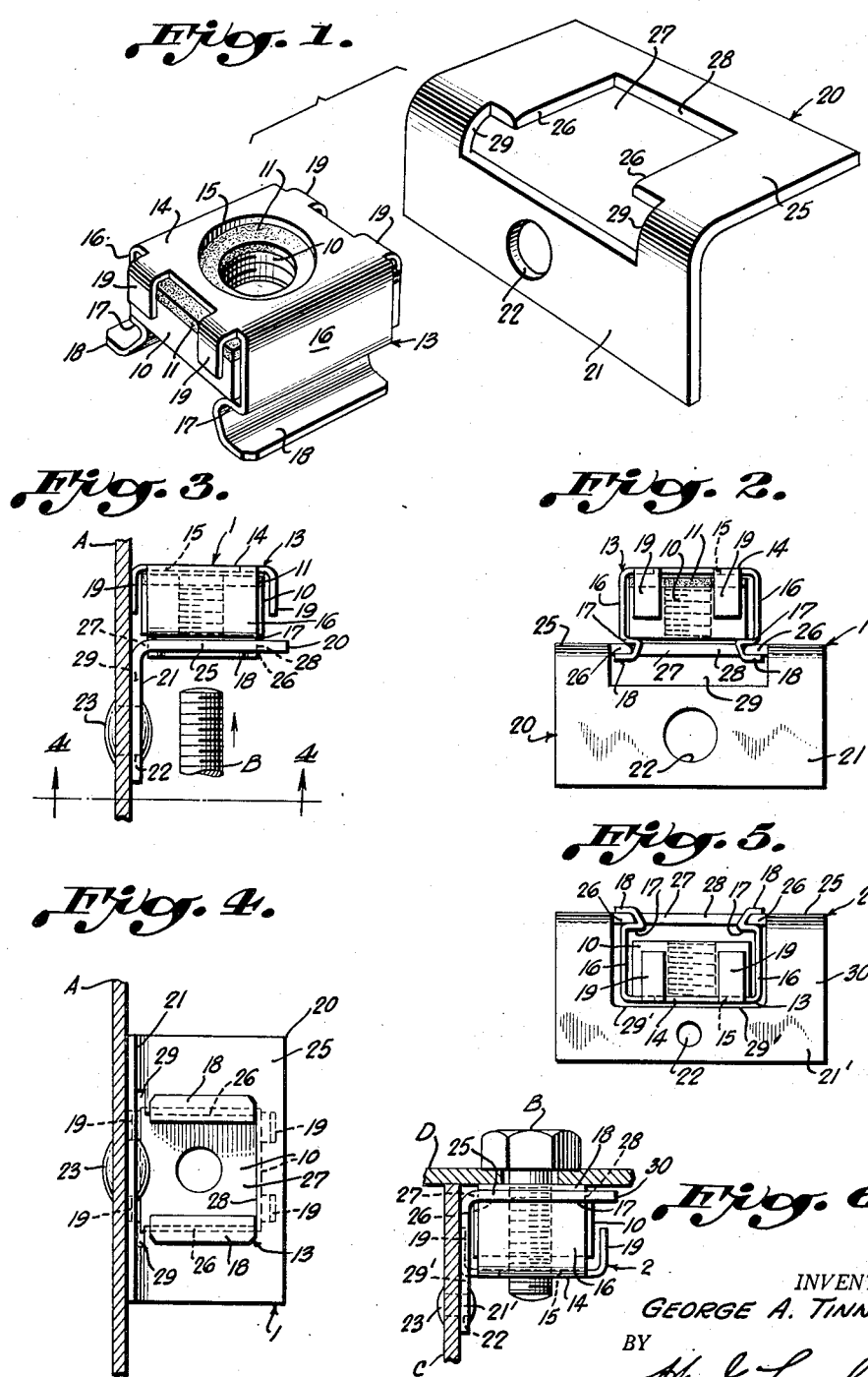
INVENTOR.
GEORGE A. TINNERMAN
BY
H. G. Lombard
ATTORNEY

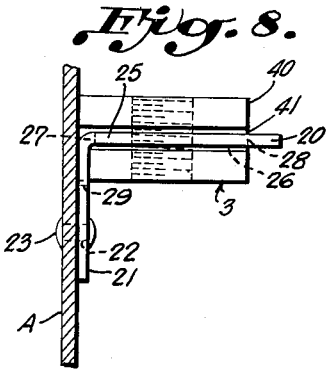
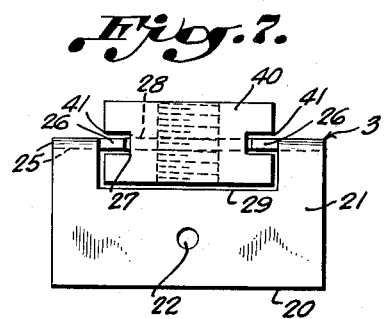
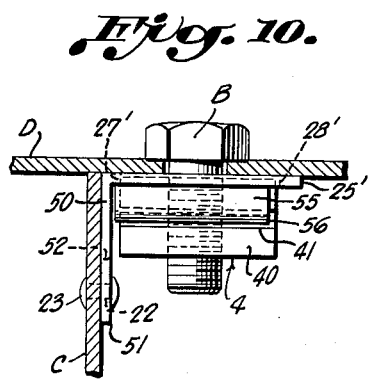
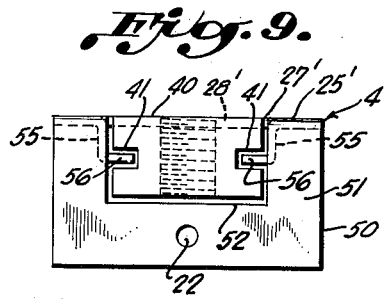
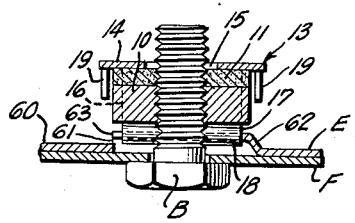
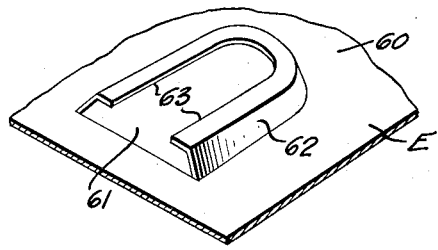
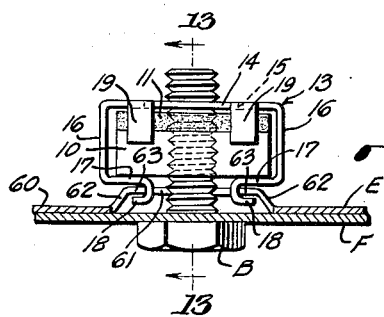

Patented Aug. 18, 1953

2,649,126

UNITED STATES PATENT OFFICE 2,649,126

CAGED NUT AND RETAINING BRACKET THEREFOR

George A. Tinnerman, Cleveland, Ohio, assignor to Tinnerman Products, Inc., Cleveland, Ohio, a corporation of Ohio Application October 14, 1949, Serial No. 121,429

1 Claim. (Cl. 151—41.76)

This invention relates in general to improvements in securing devices for structural units and deals, more particularly, with improved means for mounting or attaching nuts, tapped plates, and the like to a supporting part in position to receive a bolt or screw for securing a cooperating part to such supporting part.

In this relation, the invention deals, further, with an improved fastening means for securing the parts of an assembly in either fixed or adjustable relation and with the securing bolt or screw locked in applied position against loosening or displacement as a result of vibration and jarring effects.

A primary object of the invention is to provide an improved securing device for a structural unit in which a threaded nut, tapped plate, or the like, is attached in fastening position on a part to be secured by a simplified low-cost plate-like bracket that retains the nut against relative axial as well as relative rotative movement in attached position.

A further object of the invention is to provide such a securing device in which a cage for the threaded nut is used in conjunction with the plate-like bracket to retain the nut in attached position.

Another object of the invention is to provide a securing device of the kind described in which the nut or tapped plate is provided with means for effecting an automatic thread locking action on the bolt or screw applied to the nut.

Further objects and advantages of the invention and other new and useful features in the construction, arrangement and general combination of parts will be readily apparent as the following description proceeds with reference to the accompanying drawings, for purposes of illustration but not of limitation, in which like reference characters designate like parts throughout, and in which:

Fig. 1 is an exploded perspective view of a securing device in accordance with the invention which comprises a plate-like bracket and a nut retainer shown in position to be assembled with said bracket;

Fig. 2 shows in rear elevation the assembled plate-like bracket and nut retainer illustrated in Fig. 1;

Fig. 3 is a sectional view showing the assembled plate-like bracket and nut retainer in end elevation as attached to a supporting part; and, Fig. 4 is a sectional view of Fig. 3 as seen along line 4—4, looking in the direction of the arrows.

Fig. 5 is a rear elevational view similar to Fig. 2 showing another form of plate-like bracket and a nut retainer assembled therewith; and, Fig. 6 is a sectional view of a completed joint or connection showing the assembled bracket and nut retainer of Fig. 5 in end elevation as attached to a supporting part and with a bolt applied to the nut within the nut retainer to secure a cooperating part to said supporting part.

Fig. 7 is a rear elevational view similar to Fig. 2 showing another form of securing device in accordance with the invention; and, Fig. 8 is a sectional view showing the securing device of Fig. 7 in end elevation as attached to a supporting part.

Fig. 9 show in rear elevation a further form of securing device in accordance with the invention; and, Fig. 10 is a sectional view showing the securing device of Fig. 9 in end elevation as attached to a supporting part.

Fig. 11 is a perspective view of an area of a sheet metal part as prepared with means for attaching a nut retainer in another form of the invention;

Fig. 12 is a sectional view showing a nut retainer in end elevation as attached to the sheet metal part of Fig. 11; and, Fig. 13 is a sectional view of Fig. 12 on line 13—13, looking in the direction of the arrows.

The invention, in any form, comprises a securing device of general utility which is readily adapted for a wide range and variety of applications and uses as the means for securing a joint or connection of structural parts, particularly where the secured parts are disposed in normal relation to each other in the manner of a corner joint, for example. In other applications, securing devices in accordance with the invention are used for adjustably securing a part with respect to a cooperating part of an assembly as, for example, in a headlamp construction where the securing devices serve as a means for retaining the rods or bolts supporting the reflector within the headlamp sub-body and otherwise capable of adjustment to move the reflector as may be necessary to adjust the headlamp beam.

Referring now, more particularly, to the drawings, Figs. 1–4 inclusive disclose one embodiment of the invention comprising a securing device, designated generally 1, which includes a nut member 10 attached to a supporting part A, as shown in Fig. 3, with the axis of the thread opening in the nut extending in the same general direction as said supporting part A. The arrangement, accordingly, is such that the nut 10 is adapted to receive a bolt B, Fig. 3, which extends in the same general direction as the supporting part A for securing a cooperating part in normal or other angular relationship to said supporting part A. In an automobile headlamp construction, for example, the part A would comprise a wall portion of the headlamp housing which is provided with such securing devices 1 for receiving the bolts B which mount the associated reflector in adjustable relation in said housing.

The present invention is particularly advantageous in that the securing device 1 requires only a relatively simple and inexpensive means for attaching a nut to a supporting part in constructions of the general character described. The nut member 10 may be provided in any suitable form as a tapped plate, standard threaded nut or as a self-locking nut, and in the example of Figs. 1–4 inclusive is shown as a self-locking nut 10 which includes a fibre or plastic washer 11 provided with a reduced size bolt passage for effecting an automatic thread locking action on the bolt B applied to the threaded nut 10.

The nut 10 and associated lock washer 11 are held within a cage or retainer 13, as shown in Fig. 1, which is readily assembled with a plate-like bracket 20 as seen in Fig. 2, and this assembly then attached to the supporting part A as shown in Figs. 3 and 4. The retainer 13 is formed from a suitable blank of sheet metal which is bent to provide a box-like cage comprising a base portion 14 having a central bolt passage 15, and spring arms defining spaced wall portions 16 carrying inturned shoulders 17 merging into outwardly extending hooks 18. Integral tabs 19 depending from the sides of the base portion 14 cooperate with the spaced wall portions 16 and inturned shoulders 17 to retain the nut 10 and associated lock washer 11 within the retainer thus provided, while the inturned shoulders 17 and adjacent outwardly extending hooks 18 define a pair of spaced grooves adapted to slidably receive a pair of complementarily spaced shoulder elements on the bracket 20, as presently to be described.

In a preferred form, the fibre or plastic washer 11 is provided as a disc-like element which is securely united to the top of the nut 10 by adhesive or other suitable means and is formed with a circular unthreaded opening slightly smaller than the threaded opening in said nut 10. The arrangement is such that the bolt B, Fig. 3, is applied to the nut 10 in the usual manner and as it advances through the slightly smaller opening in the fibre or plastic washer 11, the bolt thread cuts through said washer 11 as necessary for the bolt to pass to tightened fastening position. In this relation, the fibre or plastic material of the washer surrounding the bolt exerts a pronounced binding and gripping action on one or two or more of the engaged thread convolutions of the bolt to provide an effective thread locking action thereon which prevents loosening of the bolt from tightened fastening position. In an alternate arrangement, such a fibre or plastic lock washer 11 is provided separate from the nut 10 and is retained in proper assembly therewith by a similar retainer 13 having the same general type of spring arms 16 and inturned shoulders 17 carrying outwardly extending hooks 18. However, the spring arms 16 and side tabs 19 are arranged with a closer fit around both the nut 10 and the washer 11 as necessary to maintain the same in an aligned relation in which the opening in the washer 11 is in suitable registration with the threaded opening in the nut 10. Accordingly, when the associated bolt is applied and tightened, the plastic or fibre washer 11 serves to provide a similar pronounced binding and gripping thread locking action on the bolt B. Preferably the nut 10 is provided with the fibre or plastic locking washer 11 united thereto and in a size considerably smaller than the retainer so that the nut is held in the retainer in what may be termed a floating mounting to provide for any necessary lateral adjustment of the nut in the application of the bolt thereto.

The plate-like bracket 20 is a relatively simple and inexpensive member which is readily provided from a suitable plate of sheet metal bent into an angular form to define a pair of flanges 21, 25, in substantially normal relation to each other. The attaching flange 21 is provided with one or more openings 22 for attaching the same to the wall member A by rivets 23 or any other suitable means as shown in Fig. 3, for example, and carries a projecting nut supporting flange 25. The bracket member 20 is provided with a cutout opening, as shown in Fig. 1, which defines a pair of spaced shoulders 26 on opposite sides of a recess 27 in the supporting flange 25. The recess 27 has a closed end edge 28 and at the junction of the flanges 21, 25, merges into a wider slot 29 which extends into a portion of the attaching flange 21.

The cutout opening thus formed by the recess 27 and slot 29 permits the nut retainer 20 to be assembled with the bracket, as shown in Fig. 2, and to this end, it will be seen that the slot 29 serves as an entrance opening which is so provided as to clear the extremities of the hooks 18 and permit the spaced shoulders 26 to be received in the grooves between said hooks 18 and the inturned shoulders 17.

Preferably the arrangement is such that the spring arms 16 must be compressed toward each other slightly on being applied to the spaced shoulders 26 so that the hooks 18 are connected to said shoulders 26 under spring tension. The nut retainer 20, accordingly, slides readily into assembled relation with the bracket 20 as shown in Fig. 2, simply by compressing the spring arms 16 slightly as necessary for the inturned shoulders 17 and hooks 18 to clear the edges of said spaced shoulders 26 as they are slipped through the entrance slot 29. If desired, bevels may be provided on the outer corners of said shoulders 26 to facilitate the initial assembly of the nut retainer 13 to the bracket 20. In final assembled relation, the nut retainer 13 is supported above the nut supporting flange 25 by the inturned shoulders 17 bearing on the spaced shoulders 26 with the hooks 18 in engagement with the undersides of said spaced shoulders 26 and in abutting relation to the closed end edge 28 of the recess 27. The nut retainer 13 as thus assembled with the bracket 20 is secured in the recess 27 in the flange 25 on three sides and cannot be removed from said recess except through the entrance slot or opening 29 in the attaching flange 21.

The assembly of the nut retainer 13 and bracket 20 is substantially as shown in Fig. 2 and this assembly is adapted to be attached to any suitable wall member A, as shown in Figs. 3 and 4, by securing the attaching flange 21 of the bracket 20 to said wall member by the rivet 23 or any other suitable means. In such attached position, the open slot 29 in the attaching flange 21 is, of course, covered by the wall member A in abutting relation to said attaching flange 21, and consequently, the nut retainer 20 is held secured on all sides within the recess 27 in the bracket 20. The nut retainer 13 is thus fixedly held in attached position on the wall member A against relative turning or axial displacement and cannot be removed from said bracket 20 or displaced from its final attached fastening position on the supporting wall A. In such attached position, the bolt B or adjusting screw, or the like, is applied to the threaded opening in the nut 10, as illustrated in Fig. 2, and is locked in any applied position by the fibre or plastic locking washer 11, as aforesaid, to serve any desired purpose as an adjusting screw or for securing a cooperating part to the supporting part A.

Figs. 5 and 6 illustrate another form of securing device 2 which is generally similar in construction, application and use to that described with reference to Figs. 1–4 inclusive. The securing device 2 is provided by the same type of nut retainer 13 and a modified form of bracket member 30 in which the entrance opening or slot 29' in the attaching flange 21' is made in a somewhat larger size as necessary to pass the retainer 13 therethrough to a position in which said retainer 13 depends from the underside of the supporting flange 25 substantially as shown in Fig. 5. This form of securing device is particularly adapted for use in a joint or connection such as shown in Fig. 6 in which the bracket 30 is attached to the supporting part C adjacent an end thereof such that a cooperating part D may be secured in an abutting normal relation to such end of the supporting part C by the bolt or screw B applied to the nut 10 within said retainer 13.

Figs. 7 and 8 disclose another form of securing device 3 as provided for attaching or mounting a threaded nut or tapped plate 40 to the supporting part A in a manner generally similar to that of Figs. 1–4 inclusive but without the use of a separate nut holder or retainer. The bracket member 20 is provided in the same general construction and the separate nut member 40 is provided on opposite sides with a pair of spaced grooves 41 which are adapted to receive the spaced shoulders 26 provided by the cutout recess 27 in the supporting flange 25 of the bracket 20. Thus, in a manner similar to Figs. 1–4 inclusive, the nut 40 is secured in the recess 27 in the flange 25 on three sides and cannot be removed from said recess except through the entrance slot or opening 29 in the attaching flange 21. Likewise, as shown in Fig. 8, in the attached position of the bracket 20, the entrance slot or opening 29 in the attaching flange 21 is covered by the wall member A and consequently, the adjacent end of the nut 40 is disposed in abutting relation to the supporting wall A such that said nut 40 is held in secured relation within the recess 27 in the bracket 20 on all sides and cannot be removed from said bracket.

Figs. 9 and 10 disclose another form of securing device 4 in which a slotted nut member 40 such as shown in Figs. 7 and 8, is employed with a modified form of bracket 50 adapted to support said nut 40 adjacent the end of the supporting part C so that a cooperating part D may be secured in abutting normal relation thereto smilarly to the embodiment of Figs. 5 and 6. The bracket 50 in this form of the invention is provided similarly to that of Figs. 1–4 inclusive but the attaching flange 51 is provided with an entrance slot 52 approximating the cross-section of the nut 40 so as to fully receive the same as shown in Fig. 9. The cutout recess 27' in the supporting flange 25' of the bracket 50 has a similar closed end edge 28' and is provided with depressed marginal portions at each side defining a pair of tongues 55 which are bent to form spaced shoulders 56 disposed approximately midway of the entrance slot 52 in the attaching flange 51. These spaced shoulders 56 are adapted to be received in the spaced grooves 41 on the nut 40 in a manner whereby the upper surface of said nut is substantially flush with the supporting flange 25' of said bracket 50. As seen in Fig. 10, the securing device 4 thus provided, is readily adapted to be attached adjacent the end of the supporting part C such that a cooperating part D may be secured in abutting normal relation thereto by a bolt B applied to said nut member 40 to provide a joint or connection similar to that of Fig. 6.

Figs. 11, 12 and 13 disclose another embodiment of the invention whereby a nut retainer 13 similar to that described with reference to Figs. 1–4 inclusive is adapted to be employed in various applications for securing plate or panel portions in superposed or juxtaposed relation. The supporting part E, Fig. 11, may be a plate portion 60 of any bracket, flange or other structural member and is provided with a cutout opening 61 having a depressed, countersunk marginal portion 62 bent outwardly out of the plane of said plate portion 60 to define a pair of spaced shoulders 63 for attaching the nut retainer 13 thereto in the same general manner described with reference to Figs. 1–4 inclusive. Accordingly, as best seen in Fig. 12, the nut retainer 13 is attached by the outward hooks 18 engaging the undersurfaces of said shoulders 63 and the inturned shoulders 17 seating on the upper surfaces of said shoulders 63. In the formation of the spaced shoulders 63 in such countersunk relation, said shoulders are provided with projecting free ends which permit ready application of the attaching hooks 18 of the retainer 13 to connected relation therewith, and otherwise retain said attaching hooks 18 within the depressed marginal portion 62 of the supporting part E in a manner whereby a cooperating part F may be secured in flush relation to said part E by a bolt B applied to the nut 10 and locking element 11 within said nut retainer 13.

While the invention has been described in detail with specific examples, such examples are intended as illustrations only, inasmuch as it is quite apparent that various changes may be provided without departing from the spirit and scope of the invention.

What is claimed is:

A fastening device comprising a bracket having a pair of flanges in angular relation comprising an attaching flange and a nut carrying flange, said flanges being provided with a cutout defining a recess having an open end adjacent the junction of said flanges and a pair of spaced shoulders on said nut carrying flange, a nut, and a holder for said nut, said nut holder comprising a sheet metal body bent to define a base overlying the nut, means on the sides of said base engaging the sides of the nut, arms extending from the ends of said base in the same general direction and engaging the ends of said nut such that inward flexing of said arms is prevented, said arms being bent inwardly under the nut and then outwardly to provide a pair of groove elements receiving said spaced shoulders on said nut carrying flange, said groove elements terminating in outwardly extending hooks underlying said spaced shoulders and preventing disconnection of said groove elements from said spaced shoulders in a direction axially of said nut, said attaching flange extending from adjacent said open end of said recess in the nut carrying flange and being adapted for attachment to a wall in a manner whereby said wall extends across and closes said open end of said recess to retain said nut holder in assembled relation in said recess in the attached position of the fastening device.

GEORGE A. TINNERMAN.

References Cited in the file of this patent
UNITED STATES PATENTS

| Number | Name | Date |
|---|---|---|
| 1,447,658 | Harvozinski | Mar. 6, 1923 |
| 1,609,772 | Rank | Dec. 7, 1926 |
| 2,034,559 | Brunner | Mar. 17, 1936 |
| 2,078,453 | Miller | Apr. 27, 1937 |
| 2,304,311 | Luce | Dec. 8, 1942 |
| 2,391,046 | Tinnerman | Dec. 18, 1945 |
| 2,421,201 | Hallock | May 27, 1947 |
| 2,421,905 | Perry | June 10, 1947 |
| 2,435,764 | Wessel | Feb. 10, 1948 |